United States Patent [19]
Yanagimachi

[11] Patent Number: 5,710,497
[45] Date of Patent: Jan. 20, 1998

[54] POSITIONING CONTROL DEVICE AND HEAD POSITIONING CONTROL DEVICE

[75] Inventor: Shigeyuki Yanagimachi, Tokyo, Japan

[73] Assignee: NEC Corporation, Tokyo, Japan

[21] Appl. No.: 617,650

[22] Filed: Mar. 15, 1996

[30] Foreign Application Priority Data

Mar. 17, 1995 [JP] Japan ..................... 7-058962

[51] Int. Cl.⁶ .................................... G05D 23/275
[52] U.S. Cl. ............. 318/632; 318/567; 318/568.22; 364/513.5
[58] Field of Search .................... 318/632, 560, 318/567, 568.22, 569, 600; 364/513.5

[56] References Cited

U.S. PATENT DOCUMENTS 5,003,601  3/1991  Watari et al. ................ 364/513.5 X

FOREIGN PATENT DOCUMENTS 3-288913  12/1991  Japan.
4-335272  11/1992  Japan.

Primary Examiner—Karen Masih
Attorney, Agent, or Firm—Foley & Lardner

[57] ABSTRACT

In a positioning control device of a positioning servo system for which the object of control is both secondary and has observable states and having a servo compensator that inputs position data and compensates, a normalized trajectory generator that generates an arbitrary normalized trajectory based on position data, and an initial value setting device, the initial values of the servo compensator are reset to minimize the square-law integral value used as the cost of the deviation of the position of the object of control from the normalized trajectory of the normalized trajectory generator.

7 Claims, 3 Drawing Sheets ns, normalized trajectory generating means, and initial value setting means. The position and speed detection means value of state values of the object of control. However, rather than constructively improving transient response, these methods merely attempt to improve transient characteristics by minimizing the area integral value of deviation of the target values and state values of the object of control. Thus, they do not necessarily shorten settling time.

POSITIONING CONTROL DEVICE AND HEAD POSITIONING CONTROL DEVICE

BACKGROUND OF THE INVENTION

1. Field of the Invention

The present invention relates to a positioning control device, and particularly to a head positioning control device suitable for rapidly positioning a head to a target trajectory while reducing overshoot and undershoot in a magnetic disk device.

2. Description of the Related Art

Head positioning devices for magnetic disk devices are always attended by various phenomena, including: 1) Variation in the conversion gain on power from current of the voice coil motor (VCM) used as an actuator to drive the head over the inner and outer trajectories of a disk; 2) Action of the elastic force of the flexible cable (FPC); 3) Due to various causes, such as individual variations arising at the time of fabrication of the magnetic disk device, transient response is disturbed at the time of head positioning and high-speed positioning of consistent characteristic cannot be achieved for all trajectories. These phenomena have become particularly troublesome in recent years with the advancing digitization of positioning control devices and particularly in control systems having a long sampling time.

A variety of techniques have conventionally been employed to solve these types of problems. For example, Japanese Patent Laid-open No. 244467/90 proposes a method for reducing discontinuity of the digital filter internal variable at the time of control system switching and improving transient characteristics through parallel processing of a portion of computations of the position control system digital filter at the speed control system terminal. In addition, Japanese Patent Laid-open No. 288913/91 and Japanese Patent Laid-open No. 335272/92 disclose methods for improving transient characteristics by resetting the initial value of the positioning control system when switching from the speed control system to the position control system.

The above-described examples of the prior art attempt to improve transient characteristics by eliminating discontinuity of the digital filter or minimizing the square-law integral value of state values of the object of control. However, rather than constructively improving transient response, these methods merely attempt to improve transient characteristics by minimizing the area integral value of deviation of the target values and state values of the object of control. Thus, they do not necessarily shorten settling time.

SUMMARY OF THE INVENTION

The object of the present invention is to improve such problems in the prior art, and in particular, using an initial value setting method to follow an arbitrary normalized trajectory, to improve the transient response by speeding convergence within limits, which do not exceed the control capacity of the control system. The positioning control device of a positioning servo system according to the invention thus can shorten the time required to position, for example, a head.

According to one aspect of the invention, the positioning control device of a positioning control system, where the object of control is secondary and its state value is observable, includes position and speed detection means, target trajectory generating means, servo compensation means, normalized trajectory generating means, and initial value setting means. The position and speed detection means detects the position and speed of the object of control, such as a magnetic head of a magnetic disk device. The target trajectory generating means generates a target trajectory of a target position and a target trajectory of a target speed of the object of control. The servo compensation means inputs data of the target trajectory of the target position, the target trajectory of the target speed, and the detected position and speed, and causes the position and the speed to follow the target trajectory of the target position and the target trajectory of the target speed, respectively. The normalized trajectory generating means generates an arbitrary normalized trajectory based on the detected position data.

According to one aspect of the invention, the initial value setting means can use, as a performance index, a deviation of position and speed of the object of control from the normalized trajectory output from the normalized trajectory generating means, and resets initial values of the servo compensation means to minimize a square-law integral value of the performance index.

According to another aspect of the invention, the initial value setting means can initialize the internal state of the servo compensation means such that the position of the object of control follows the normalized trajectory generated by the normalized trajectory generating means.

The normalized trajectory generating means can include means that generates a primary normalized trajectory having an arbitrary band width and taking as initial value the absolute value of deviation of the position of the object of control from the target position at the point where the absolute value of deviation becomes smaller than an arbitrary value.

The normalized trajectory generating means can include means that generates a secondary normalized trajectory having an arbitrary band width and damping ratio and taking as initial position the absolute value of deviation of the position of the object of control from the target position and as initial speed the value obtained by multiplying a precalculated ratio by the absolute value of the deviation, at the point at which the absolute value of deviation becomes smaller than an arbitrary value.

The normalized trajectory generating means can include means that generates n-degree normalized trajectories having an arbitrary band width and taking as initial position the absolute value of deviation of the position of the object of control from the target position and as initial state values (n−1) obtained by multiplying a precalculated ratio by the absolute value of the deviation, at the point at which the absolute value of deviation becomes smaller than an arbitrary value. The initial value setting means can include means that initializes internal states of the servo compensation means such that n outputs of the object of control follow the output of the normalized trajectory generating means.

According to another aspect of the invention, the initial value setting means can initialize internal state of the servo compensation means such that the position and speed of the object of control, e.g., a magnetic head, follow the output of the normalized trajectory generating means at the point at which the absolute value of the deviation of the position of the magnetic head from the target position becomes smaller than an arbitrary value.

Another aspect of the invention is a head positioning control device of a magnetic disk device, which control device includes head position detection means, head speed detection means, mechanical vibration elimination means, normalized trajectory generating means, servo compensation means, and initial value setting means. The head position detection means detects the position of a magnetic head with respect to a data surface. The head speed detection means detects the speed of the magnetic head. The mechanical vibration elimination means eliminates the mechanical vibration component from the output of the head position detection means. The normalized trajectory generating means generates a normalized trajectory based on position data of the magnetic head. The servo compensation means inputs data of the position and speed of the magnetic head, compensates such that the position of the magnetic head accords with the target position, and controls a drive amplifier of the magnetic head. Finally, the initial value setting means initializes internal state of the servo compensation means such that the position and speed of the magnetic head follow the output of the normalized trajectory generating means at the point at which the absolute value of the deviation of the position of the magnetic head from the target position becomes less than an arbitrary value.

In place of the prior-art initial value setting method, which improved only in terms of minimizing a square-law integral value of the state value of the object of control, the present invention uses an initial value setting means where the transient response of the control system follows a normalized trajectory of faster settling time, thereby consciously eliminating a vibration component from the transient characteristics and effectively shortening the time required for positioning of the object of control, such as a magnetic head. In particular, by using the internal states of a notch filter and the position signal and speed signal of the target object, values that are difficult to set as initial values, at the point at which the deviation of a position signal and a target position becomes smaller than an arbitrary value, and initializing the remaining settable state values, the remaining transient response of the control system can be made to follow a normalized trajectory of faster settling time. As a result, by incorporating this method into the position control of a magnetic head, high-speed positioning can be realized with little overshooting or undershooting.

The above and other objects, features, and advantages of the present invention will become apparent from the following description with references to the accompanying drawings that illustrate examples of the present invention.

DETAILED DESCRIPTION OF THE PREFERRED EMBODIMENTS

Figure 1:
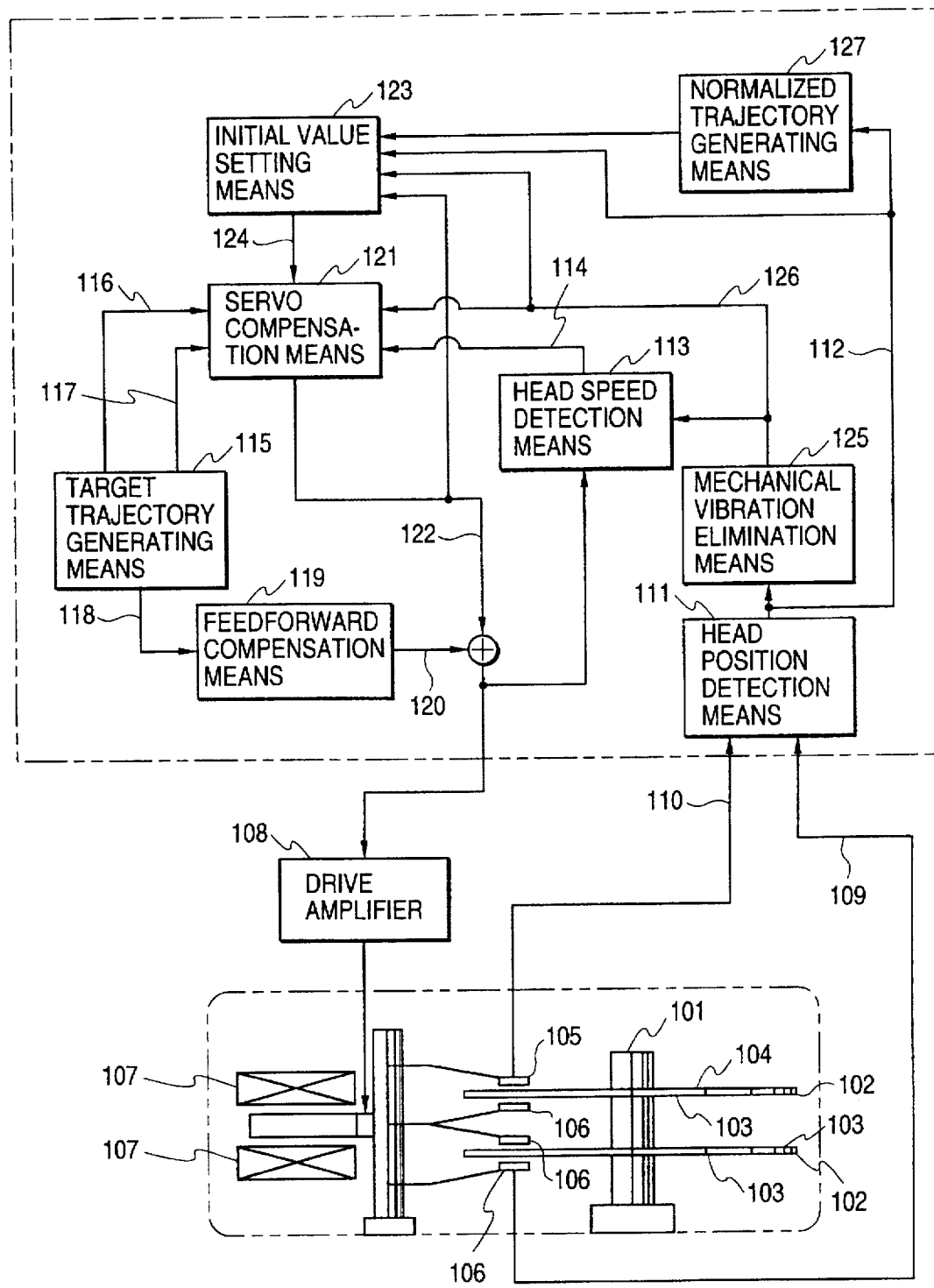
FIG. 1 shows the construction of a first embodiment of the head positioning control device according to the present invention.

FIG. 1 shows a head positioning control device for a magnetic disk device according to the first embodiment of the present invention.

This head positioning control device is made up of head position detection means 111, mechanical vibration elimination means 125, head speed detection means 113, normalized trajectory generating means 127, initial value setting means 123, servo compensation means 121, target trajectory generating means 115, feedforward compensation means 119, and drive amplifier 108, and controls positioning of combined head 106 and servo head 105.

Combined head 106 is driven by VCM actuator 107, reads signals recorded in the data surface 103 of thin-film magnetic disk 102, which is mounted on a fixed spindle, detects each voltage according to distance from trajectory center, and accordingly generates data head position error signal 109, which is the deviation from a trajectory center. Combined head 106 integrates a thin-film inductive head and a magnetoresistant (MR) head for reading and writing to the data surface of thin-film magnetic disk 102.

Servo head 105 is driven by VCM actuator 107, reads signals recorded on the servo surface 104 of thin-film magnetic disk 102, and generates servo head position error signal 110 by the same process as for data head position error signal 109. First, to position servo head 105 at the center of a target trajectory of servo surface 104, positioning control is performed such that servo head position error signal 110 becomes "0". However, despite successful positioning of servo head 105 a trajectory center on servo surface 104, positioning of combined head 106, which performs the actual reading and writing of data, may fail due to the occurrence of a slight shift.

Here, head position detection means 111 calculates the number of trajectories crossed by servo head 105 and its direction based on the two signals 109 and 110. Head position detection means 111 then continuously detects the position of combined head 106 with respect to data surface 103 from the innermost to the outermost trajectory of thin-film magnetic disk 102 regardless of the direction of movement of combined head 106, generates head position signal 112 in which servo head position error signal 110 is added to data head position error signal 109, and outputs this signal to mechanical vibration elimination means 125.

Mechanical vibration elimination means 125 inputs head position signal 112, generates a new head position signal 126 wherein the mechanical resonance component is removed from head position signal 112, and outputs to head speed detection means 113 and servo compensation means 121. A band elimination filter is employed as mechanical vibration elimination means 125 which, for example, when a 6-kHz mechanical resonance component is present, steeply drops a 6 kHz frequency component to eliminate this component. A band elimination filter is constructed by providing a digital filter routine in a digital arithmetic section, the digital filter being made up of a formula, and mechanical resonance component can be removed by inputting head position signal 112 to the routine.

Head speed detection means 113 detects the speed of combined head 106 with respect to data surface 103 from new head position signal 126, from which the mechanical resonance component has been eliminated, and output to drive amplifier 108, generates head speed signal 114, and outputs this signal to servo compensation means 121. VCM actuator 107, which is the object of control, is numerically approximated by $1/s^2$ (s: Laplacean). Here, a numerical model, which is equivalent to the VCM actuator, is constructed in the digital arithmetic section. By inputting to this constructed numerical model the output to drive amplifier 108, which is the input of the object of control, the movement of the object of control can be simulated on the digital arithmetic section. Accordingly, head position and head speed can be estimated by formula. However, because the actual object of control retains an indeterminable component and diverges somewhat from $1/s^2$, the difference between this estimated position and new head position signal 126 is fed back and the divergence compensated. Head speed signal 114 is the estimated speed signal after compensating for the divergence.

Normalized trajectory generating means 127 generates an arbitrary normalized trajectory based on head position signal 112.

Target trajectory generating means 115 is composed of a low-pass filter or a band elimination filter, and a model that numerically approximates VCM actuator 107. In consideration of the effect of the counter electromotive force of VCM actuator 107, the output of numerical approximation model of VCM actuator 107 is generated as target trajectory 116 of target position, target trajectory 117 of target speed, and target trajectory 118 of target acceleration of combined head 106. The output of the numerical approximation model of VCM actuator 107 represents approximately the movement of combined head 106. By determining the acceleration, deceleration, and maximum speed of combined head 106, the position trajectory, speed trajectory, and acceleration trajectory of combined head 106 moving at this set acceleration and deceleration can be found by computation from this numerical model. These are the target trajectory 116 of the target position, the target trajectory 117 of the target speed, and the target trajectory 118 of the target acceleration, respectively.

Target trajectory 116 of target position and target trajectory 117 of target speed output from target trajectory generating means 115 are input to servo compensation means 121, and target trajectory 118 of target acceleration is input to feedforward compensation means 119.

Feedforward compensation means 119 uses target trajectory 118 of target acceleration to generate drive input 120 for driving VCM actuator 107 in advance according to the target trajectory, and outputs to drive amplifier 108. Feedforward compensation means 119 also includes means for estimating the loop gain of actuator 107 and adjusts internal gain to individual variations of the disk device.

Servo compensation means 121 is of trajectory tracking type and generates control signals 122 for causing new head position signal 126, from which the mechanical resonance component is eliminated, and head speed signal 114 to follow target trajectory 116 of target position and target trajectory 117 of target speed, respectively, and outputting to drive amplifier 108, thus performing positioning of combined head 106. Here, in the coarse movement zone (seek movement zone) until combined head 106 nears the target position vicinity, servo compensation means 121 is placed in PD control, and the sum of the product of the gain multiplied by the difference between new head position signal 126 and target trajectory 116 of target position and the product of the gain multiplied by the difference between head speed signal 114 and target trajectory 117 of target speed becomes control signal 122. In addition, in the vicinity of the target position, for example, at 0.5 trajectories before the target position (follow zone), servo compensation means 121 is placed in PID control, and the product of the gain multiplied by the integral value of the position error signal from the target position is added to the above-described control input and made control signal 122. Servo compensation means 121 has the function of estimating the loop gain of actuator 107 and adjusts internal gain according to individual differences of the magnetic disk device.

Initial value setting means 123 has the function of setting initial values of servo compensation means 121. These initial values indicate the initial values of an integrator when servo compensation means 121 is in PID control. In a broad sense, if the position and speed estimation structure (observer) is included as the servo compensation means, the internal state values of the observer are also included within these initial values. The initial values in this case are not the initial state when the head commences motion, but rather, the rewritten values when rewriting internal state values during motion in order to improve transient response.

The initial value setting means 123 will next be explained in detail. In the present embodiment, explanation is presented on the premise that the closed loop system of the overall control system, which includes head position signal 112 and head speed signal 114 as one portion of internal state, is an n-degree digital system.

If target trajectory 116 of target position, target trajectory 117 of target speed and target trajectory 118 of the target acceleration are made after setting initial values, the closed loop state equation of the overall control system, which includes new head position signal 126 and head speed signal 114, as well as servo compensation means 121, mechanical vibration elimination means 125, is shown by equation (1) below, and the output equation is the following equation (2).

$$X(k+1)=A \cdot X(k) \quad (1)$$

$$y(k)=C \cdot X(k) \quad (2)$$

where x is a state variable of the closed loop system taking in all of $(1/s^2)$ representing the object of control digitally by formula, including servo compensation means 121, mechanical vibration elimination means 125, head speed detection means 113, drive amplifier and head positioning structure; y is the output value of the closed loop system; k is order of the recursion formula of digital control; A is the system matrix (n×n); and C is the output matrix (n×m).

However, the internal state value of the closed loop can be represented in the following equation (3):

$$X=[X_{cn}{}^T X_p{}^T]^T \quad (3)$$

where letter c represents the internal state of servo compensation means 121, n represents the internal state of mechanical vibration elimination means 125, p represents the state value of each of head position signal 112 and head speed signal 114.

The internal state of servo compensation means 121 is an integral value, the internal state of mechanical vibration elimination means 125 is the state value of the filter when represented by formula (state values exist in the same number as the filter degree), and the internal value of head position signal 112 and the internal value of head speed signal 114 indicate the secondary state value of $(1/s^2)$ when the object of control is represented by a formula.

Servo compensation means 121 is, for example, a PID controller, the variables of the internal state value of an integrator, which is the internal state value of a PID controller, can be set variably, and the state variables are divided between $x_1, x_2, \ldots x_{n-4}$. Mechanical vibration elimination means 125 is for example a secondary band elimination filter, and its state variables are divided between $x_{n-3}$ and $x_{n-2}$. In addition, $x_{n-1}$ is allotted to head position signal 112 and $x_n$ is allotted to head speed signal 114.

The following explanation takes the final point of equilibrium of n internal states as zero, but even in cases in which the point of equilibrium is not zero, the same result can be obtained by taking into account the difference between the non-zero equilibrium point and internal states.

Next, the state equation of a normalized trajectory is shown in formula (4), and the output equation is shown in formula (5):

$$Xr(k+1) = ArXr(k) \quad (4)$$

$$yr(k) = CrXr(k) \quad (5)$$

where Xr is the state variable when normalized trajectory is represented as a state matrix expression (when the trajectory is a secondary trajectory, it has two state variables, the normalized position trajectory and the normalized speed trajectory); Ar is the state matrix of the normalized trajectory; yr is the output of the normalized trajectory; and Cr is the output matrix of the normalized trajectory.

Next, the cost function for minimizing the deviation between the output of the control system (for example, the new head position signal 126 position and the position trajectory of normalized trajectory (formula (5)) will be established as shown in formula (6):

$$J = \sum_{k=0}^{\infty} \{yr(k) - y(k)\}^T \cdot Q \cdot \{yr(k) - y(k)\} \quad (6)$$

where Q is a weighting matrices, for example, if normalized trajectory is secondary, and yr (k)−y(k) of formula (6) becomes (position deviation, speed deviation), $$Q = \begin{bmatrix} 1 & 0 \\ 0 & 1 \end{bmatrix}$$

formula (6) a becomes square-law integral value that equally weights the position deviation and speed deviation. Weighting of the position deviation and speed deviation can be freely varied by modifying this weighting matrices Q.

Formula (7) is a matrix expression of the state equations in an enlarged system that mixes the state equation of the entire control system and the state equation of the normalized trajectory, and formula (8) is the output equation:

$$\begin{bmatrix} X(k+1) \\ Xr(k+1) \end{bmatrix} = \underbrace{\begin{bmatrix} A & o \\ o & Ar \end{bmatrix}}_{\Delta A_{ext}} \begin{bmatrix} X(k) \\ Xr(k) \end{bmatrix} \cdot X_{ext}(k) \quad (7)$$

$$\begin{bmatrix} y(k) \\ yr(k) \end{bmatrix} = \underbrace{\begin{bmatrix} C & o \\ o & Cr \end{bmatrix}}_{\Delta C_{ext}} \begin{bmatrix} X(k) \\ Xr(k) \end{bmatrix} \cdot X_{ext}(k) \quad (8)$$

Rewriting cost function (formula (6)) using these equations yields the following formula (9):

$$J = \sum_{k=0}^{\infty} X_{ext}^T \cdot Q_{ext} \cdot X_{ext} \quad (9)$$

However, $$Q_{ext} = (C_{ext})^T \cdot c^T \cdot Q \cdot c \cdot C_{ext} \quad (10)$$

$$c = \{-1, 1\} \quad (11)$$

Accordingly, by resetting the weighting function according to formula (9) and minimizing the value of cost function (formula (9)), an initial value can be set that minimizes the deviation of the output of control system and normalized trajectory.

The following formula (12) presents a description of the cost function (formula (9)) divided between state values (the internal state values of servo compensation means 121) that can be variably set, and state values (the state values of head position signal 112, the state value of head speed signal 114, the internal state value of mechanical vibration elimination means 125, the internal state value of the normalized trajectory) that are measured to set initial values:

$$J = \sum_{k=0}^{\infty} [X_{cn}^T X_p^T X_r^T] Q_{ext} \begin{bmatrix} X_{cn} \\ X_p \\ X_r \end{bmatrix} \quad (12)$$

$$= \sum_{k=0}^{\infty} [X_c^T X_{npr}^T] Q_{ext} \begin{bmatrix} X_c \\ X_{npr} \end{bmatrix}$$

where Xcn is the state variable of servo compensation means 121 and mechanical vibration elimination means 125; Xnpr is the state variable on the measuring side; these state values being used to set the internal state values on the state variable Xc side.

Using the well-known discrete-time Lyapunov equation (formula (13)), cost function (formula (12)) takes the form of formula (14):

$$[(A_{ext})^T \cdot P \cdot A_{ext}] - P = -Q_{ext} \quad (13)$$

$$J = X_{ext}^T(0) \cdot P \cdot X_{ext}(0) \quad (14)$$

$$= X_c^T(0) X_{npr}^T(0) \begin{bmatrix} p_{11} & p_{12} \\ p_{12}^T & p_{22} \end{bmatrix} \begin{bmatrix} X_c(0) \\ X_{npr}(0) \end{bmatrix}$$

where P in formula (14) is calculated from formula (13). In formula (14), p11, p12, and p22 indicate member 11, member 12, and element 22 of P, respectively.

Cost function (formula (14)) is a secondary function of the internal state value of servo compensation means 121, and consequently, a minimal value exists for formula (14), which is the minimum. Accordingly, the initial value of servo compensation means 121 that minimizes the cost function can be represented by formula (15):

$$X_c(0) = (-p_{11})^{-1} p_{12} X_{pr}(0) \quad (15)$$

Initial value setting means 123 stores $(-p_{11})^{-1} \cdot p_{12}$ as a coefficient matrix in advance.

Figure 2:
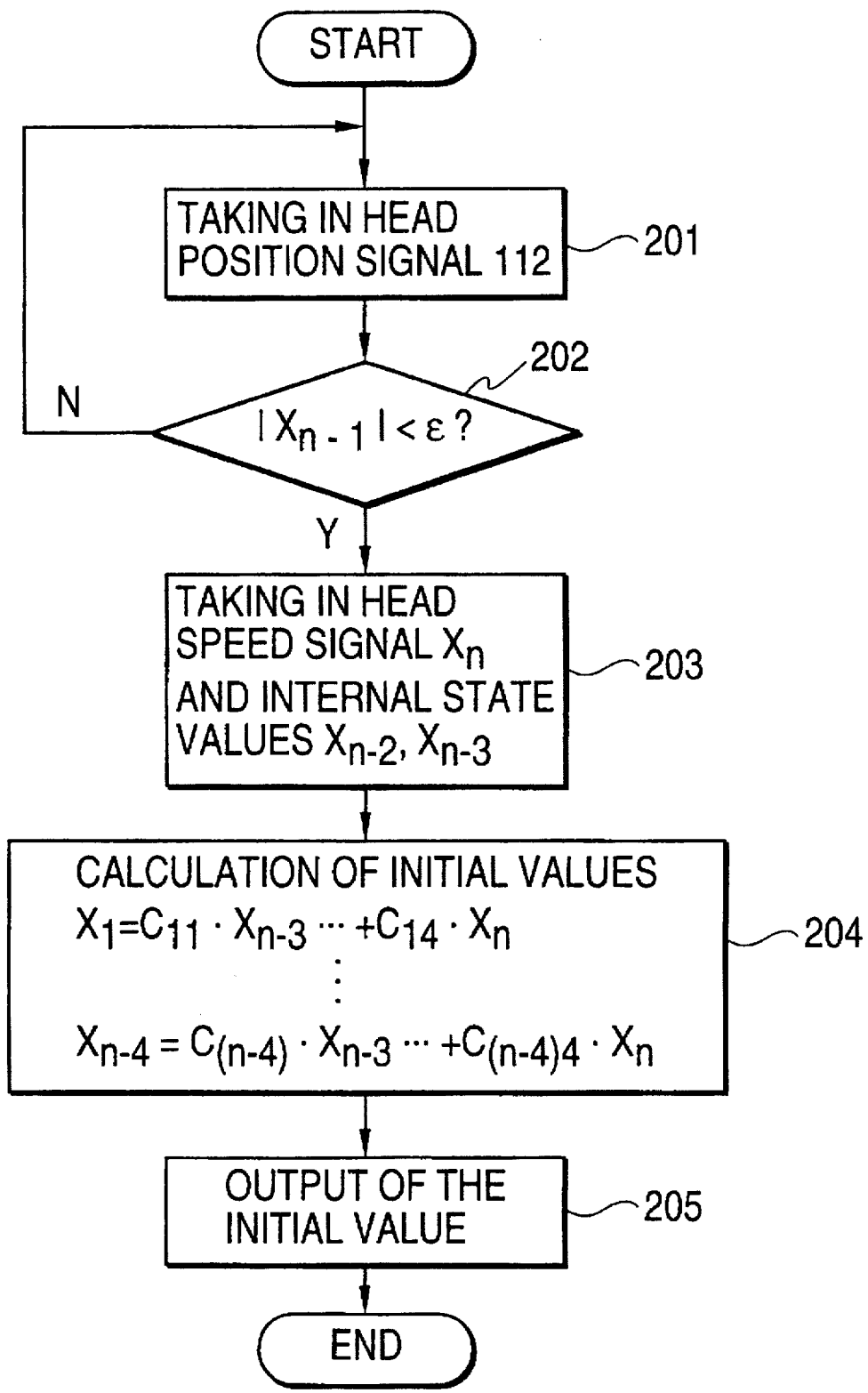
FIG. 2 is a flow chart showing the processing of initial value setting means 123.

The initial value setting operation will next be explained with reference to the flow chart of FIG. 2. In Step 201, initial value setting means 123 first takes in head position signal 112 during a head positioning operation. Next, in Step 202, a calculation is performed to determine whether head position signal 112 is smaller than an arbitrary value ε. If the conditions of Step 202 are met, head speed signal 114 and the internal state value of mechanical vibration elimination means 125 are taken in in Step 203, and in Step 204, these values are used to find one time the internal state value of servo compensation means 121 in accordance with formula (15). In Step 205, this initial value is output to servo compensation means 121. By performing this setting of initial value, the transient response of the control system can be subsequently made to follow an arbitrary normalized trajectory, and as a result, high-speed head positioning can be realized without overshooting or undershooting.

Figure 3:
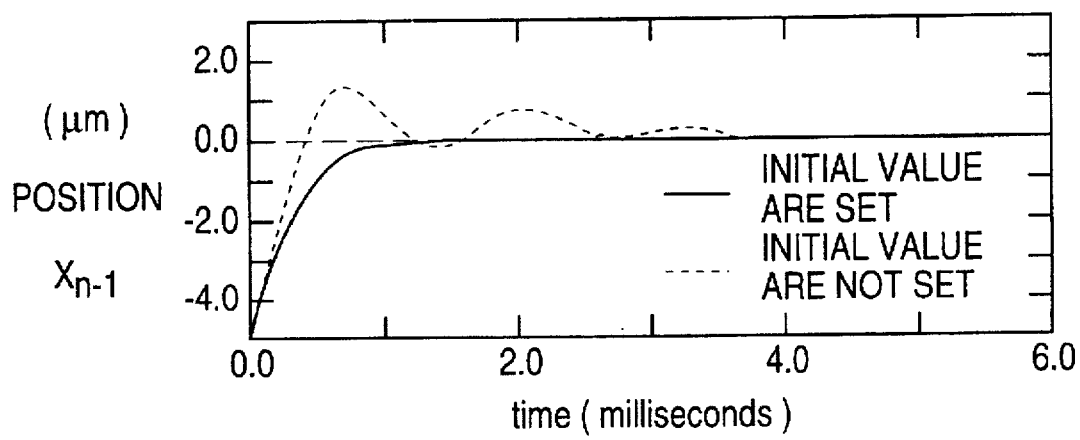
FIG. 3 shows an example of transient response of the head position in the embodiment of FIG. 1.
Figure 4:
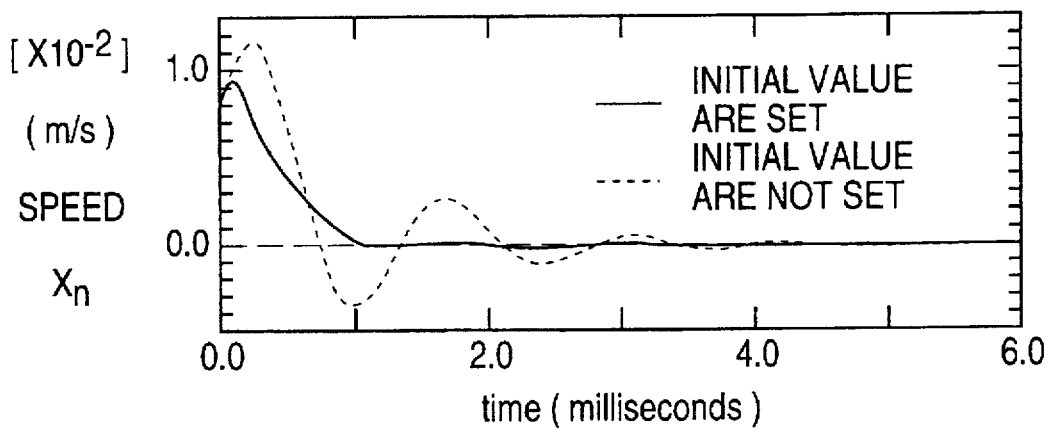
FIG. 4 shows an example of the transient response of the head speed in the embodiment of FIG. 1.

FIG. 3 and FIG. 4 present a comparison of transient response during head positioning for a case in which initial values are set according to the present invention (solid line) and for a case in which initial value compensation is not performed (dotted line). FIG. 3 shows head position $X_{n-1}$ and FIG. 4 shows head speed $X_n$. Both are the-same at the first head position −4 (μm) and head speed 0.08 (m/s), but while overshoot and vibration occur in position $X_{n-1}$ and speed $X_n$, in the example shown by dotted line in which the internal state of servo compensation means 121 is set to "0" without performing initial value setting, in the present embodiment shown by the solid line, virtually no overshoot or vibration is produced, and with respect to position in particular, transient response settles more than 2 milliseconds faster.

Although one example of the head positioning control device of the present invention has been presented in the foregoing explanation, the present invention may also be applied to other positioning control devices.

While a preferred embodiment of the present invention has been described using specific terms, such description is for illustrative purposes only, and it is to be understood that changes and variations may be made without departing from the spirit or scope of the following claims.

What is claimed is:

1. A positioning control device of a positioning control system, wherein an object of control is secondary and has observable state values, comprising:

position and speed detection means that detects position and speed of said object of control;

target trajectory generating means that generates a target trajectory of a target position and a target trajectory of a target speed of said object of control;

servo compensation means that inputs data of said target trajectory of the target position, said target trajectory of the target speed, and detected position and speed, and causes the position and the speed to follow said target trajectory of the target position and said target trajectory of the target speed, respectively;

normalized trajectory generating means that generates an arbitrary normalized trajectory based on detected position data; and initial value setting means that uses as a performance index a deviation of position and speed of said object of control from said normalized trajectory output from said normalized trajectory generating means, and resets initial values of said servo compensation means to minimize a square-law integral value of the performance index.

2. A positioning control device of a positioning control system, wherein an object of control is secondary and has observable state values, comprising:

position and speed detection means that detects position and speed of said object of control;

target trajectory generating means that generates a target trajectory of a target position and a target trajectory of a target speed of said object of control;

servo compensation means that inputs data of said target trajectory of the target position, said target trajectory of the target speed, and detected position and speed, and causes said position and said speed to follow said target trajectory of the target position and said target trajectory of the target speed, respectively;

normalized trajectory generating means that generates an arbitrary normalized trajectory based on detected position data; and initial value setting means that initializes internal states of said servo compensation means such that the position of said object of control follows a normalized trajectory generated by said normalized trajectory generating means.

3. A positioning control device according to claim 2, wherein said normalized trajectory generating means includes means that generates a primary normalized trajectory having an arbitrary band width and taking as initial value an absolute value of deviation of the position of the object of control from the target position at a point where said absolute value of deviation becomes smaller than an arbitrary value.

4. A positioning control device according to claim 2, wherein said normalized trajectory generating means includes means that generates a secondary normalized trajectory having an arbitrary band width and damping ratio and taking as initial position absolute value of deviation of the position of the object of control from the target position and as initial speed a value obtained by multiplying a precalculated ratio by said absolute value of deviation, at a point at which said absolute value of deviation becomes smaller than an arbitrary value.

5. A positioning control device according to claim 2, wherein:

said normalized trajectory generating means includes means that generates n-degree normalized trajectories having an arbitrary band width and taking as initial position an absolute value of deviation of the position of an object of control from the target position and as initial state values (n−1) obtained by multiplying a precalculated ratio by said absolute value of deviation, at a point at which said absolute value of deviation becomes smaller than an arbitrary value; and said initial value setting means includes means that initializes internal states of said servo compensation means such that n outputs of object of control follow output of said normalized trajectory generating means.

6. A head positioning control device of a magnetic disk device, wherein an object of control is secondary and has observable state values, comprising:

position and speed detection means that detects position and speed of a magnetic head;

target trajectory generating means that generates a target trajectory of a target position and a target trajectory of a target speed of said magnetic head;

servo compensation means that inputs data of said target trajectory of the target position, said target trajectory of the target speed, and detected position and speed, and causes said position and said speed to follow said target trajectory of the target position and said target trajectory of the target speed, respectively;

normalized trajectory generating means that generates an arbitrary normalized trajectory based on detected position data; and initial value setting means that initializes internal states of said servo compensation means such that position and speed of said magnetic head follow output of said normalized trajectory generating means at a point at which absolute value of deviation of the position of said magnetic head from the target position becomes smaller than an arbitrary value.

7. A head positioning control device of a magnetic disk device, wherein an object of control is secondary and has observable state values, comprising:

head position detection means that detects position of a magnetic head with respect to a data surface;

head speed detection means that detects speed of said magnetic head;

mechanical vibration elimination means that eliminates mechanical vibration component from output of said head position detection means;

normalized trajectory generating means that generates a normalized trajectory based on position data of said magnetic head;

servo compensation means that inputs the position data of said magnetic head and speed data of said magnetic head, compensates such that the position of said magnetic head accords with a target position, and controls a drive amplifier of said magnetic head; and initial value setting means that initializes internal states of said servo compensation means such that position and speed of said magnetic head follow output of said normalized trajectory generating means at a point at which absolute value of deviation of the position of said magnetic head from the target position becomes less than an arbitrary value.

* * * * *